United States Patent
Jayakrishnasamy et al.

(10) Patent No.: US 12,488,183 B2
(45) Date of Patent: Dec. 2, 2025

(54) METHOD AND SYSTEM FOR INSIGHTFUL PHRASE EXTRACTION FROM TEXT

(71) Applicant: Verizon Patent and Licensing Inc., Basking Ridge, NJ (US)

(72) Inventors: Miruna Jayakrishnasamy, Vellore (IN); Prakash Ranganathan, Tamilnadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 295 days.

(21) Appl. No.: 18/080,387

(22) Filed: Dec. 13, 2022

(65) Prior Publication Data
US 2024/0193365 A1    Jun. 13, 2024

(51) Int. Cl.
*G06F 40/289* (2020.01)

(52) U.S. Cl.
CPC .................. *G06F 40/289* (2020.01)

(58) Field of Classification Search
CPC ......... G10L 13/08; G10L 25/30; G10L 17/06; G06F 40/30; G06F 40/289; G06F 40/20; G06F 40/205; G06F 40/295; G06F 40/284; G06F 40/279; G06F 16/3347; G06F 16/345; G06F 16/9038; G06F 2216/03; G06F 18/254; G06F 40/56; G06F 16/24575; G06F 16/35; G06F 16/355; G06F 3/0481; G06F 3/04842
See application file for complete search history.

(56) References Cited

U.S. PATENT DOCUMENTS

| | | | |
|---|---|---|---|
| 2009/0193011 A1* | 7/2009 | Blair-Goldensohn | G06F 16/345 707/999.005 |
| 2019/0377763 A1* | 12/2019 | Sundaresan | G06F 40/30 |
| 2021/0117617 A1* | 4/2021 | Blaya | G06N 20/00 |
| 2021/0216909 A1* | 7/2021 | Adiga | G06F 18/10 |
| 2022/0382795 A1* | 12/2022 | Sengupta | G06F 18/24137 |
| 2022/0382982 A1* | 12/2022 | Orbach | G06F 16/2468 |
| 2024/0028927 A1* | 1/2024 | Kumar | G06N 5/04 |

OTHER PUBLICATIONS

4. El-Kassas et al., ("Automatic text summarization: A comprehensive survey." Expert systems with applications 165 (2021): 113679) (Year: 2021).*
5. Ramponi et al.,("High-Precision Biomedical Relation Extraction for Reducing Human Curation Efforts in Industrial Applications," in IEEE Access, vol. 8, pp. 150999-151011 (2020)) (Year: 2020).*
Agarwal, Basant, and Namita Mittal. Prominent feature extraction for sentiment analysis. Berlin: Springer International Publishing, 2016. (Year: 2016).*

* cited by examiner

*Primary Examiner* — Bhavesh M Mehta
*Assistant Examiner* — Jangwoen Lee

(57) ABSTRACT

The present teaching relates to extracting insightful phrases from an input text. Independent contexts are first identified from the input text. With respect to each independent context, initial candidate phrases are generated with respect to linguistic features and are then filtered. Various features are then computed for each filtered candidate phrase and used to select top k candidate phrases for each independent context. A most insightful phrase is then selected from the k top candidate phrases using deep learned models. Such selected most insightful phrases for the independent contexts are then used for facilitating an understanding the input text.

20 Claims, 14 Drawing Sheets

| Linguistic features | POS weightage | Phrase length | Sentiment score | ---------- |

Fig. 4A

METHOD AND SYSTEM FOR INSIGHTFUL PHRASE EXTRACTION FROM TEXT

BACKGROUND

Textual information, such as words, phrases, sentences, as well as how words are combined may be used to exhibit certain feeling or sentiment towards discussed particular topic, e.g., a particular product, service or the like. Assessment of sentiment expressed via textual information has become increasingly important especially when so much communication is in a textual form, for example, customers feedback.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4A shows exemplary features used in identifying relevant phrases, in accordance with an embodiment of the present teaching;

DETAILED DESCRIPTION OF EXAMPLE EMBODIMENTS

Figure 1:
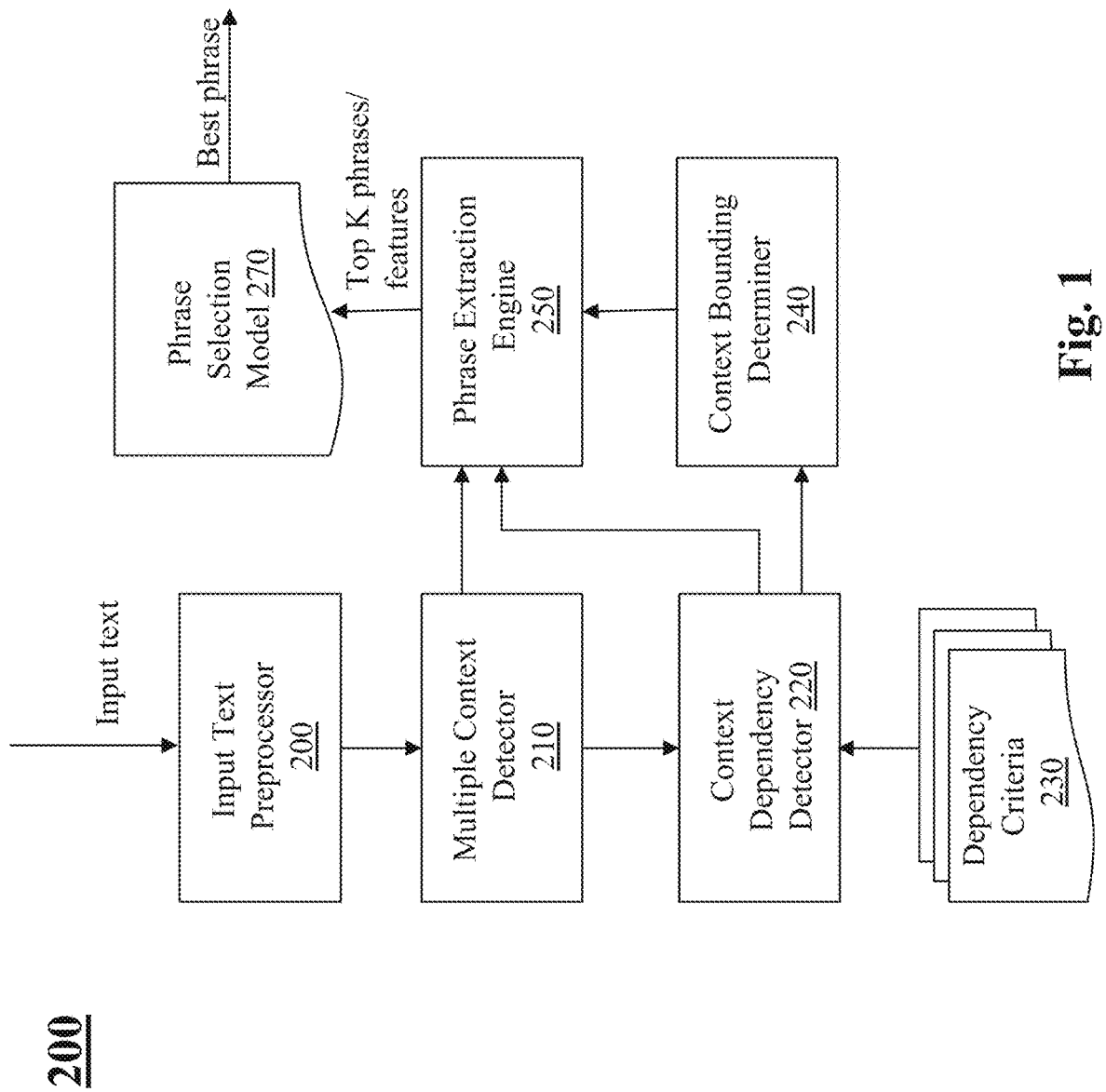
FIG. 1 depicts an exemplary high level system diagram of a framework for extracting relevant phrases from an input text, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching is directed to extracting insightful phrases from an input text. Understanding customers' feedback on products is essential for a manufacturer or service product to adapt its product to better meet the expectation of the market. Understanding semantics and/or sentiment expressed through textual information often relies on phrases identified from the textual information. Extraction of parts of the textual information, such as phrases, that are more relevant to the intent or sentiment expressed via the textual information may facilitate a better understanding of such intent and sentiment. Traditional approaches have so far not been successful in extracting meaningful or insightful phrases from text information that may be less formal, fragmented, such as in the case of customers' feedback.

In some situations, an input text may involve a single context and in other situations, there may be multiple independent contexts in the input text. For instance, customers may submit feedback for products they bought online that are posted to the product page. In one example, a consumer or purchaser may provide the following comment: "device battery life is still not the best one," which has a single context related to device battery. In another example, an iPhone user may comment by entering "love the games and hate the apps." In this example, there are not only two independent contexts, one relating to games and the other to apps, but also having text grammatically incorrect. To extract insightful phrases from an input text, embodiments of the present disclosure describe detecting independent contexts in the input text and extracting, separately with respect to each independently identified context, phrases associated with each context. Based on the extracted phrases related to each detected context, a number of top phrases for the context may be selected and are used for identifying insightful phrase(s). In some cases, these top phrases are identified based on artificial intelligence (AI) models trained using machine learning models such as deep learning models. In some embodiments, the deep learning models may identify insightful phrases from k phrases by fusing different characteristics of the phrases via integration. The insightful phrases identified from an input text, whether from a single context or from multiple contexts, may then be used to facilitate an understanding of what the input text is expressing with respect to the subject associated with a corresponding context. These insightful phrases may be used in understanding the feedback or comments, which in applications may suggest improvement needed in a, e.g., product or features associated with the product that may be highlighted in marketing. An accurate understanding may also help to refine recommendation engines, giving actionable information regarding user purchases, cellular plan upgrade information and may even be used in searching for appropriate FAQs to provide to a user or agent.

Conventional solutions for extracting phrases from an input text have not been able to identify meaningful or insightful phrases. For example, for input text "device battery life is still not the best one," the extracted phrases include "device battery life," "device battery," and "battery life" but do not include the expected phrase "battery life is still not the best". In another example, input text "lots of awesome apps camera is flashy GPS is awesome" also has multiple contexts, namely "apps," "camera," and "GPS." The traditional solutions are able to extract quite a few phrases, however those solutions fail to recognize the multiple contexts in the textual data and do not extract phrases with respect to each context separately. As a result, although some extracted phrases capture information associated with individual context, other extracted phrases commingle different contexts and fail to accurately capture the intent that the input text is expressing.

There are various situations in which conventional approaches fail to identify meaningful phrases from textual information, including in both situations where an input text involves a single context and where there are multiple contexts in an input text. For example, in a single context situation, the traditional approaches may fail because of, e.g., missing patterns or inclusion of irrelevant words in phrase extraction. With respect to an input text with multiple contexts, the traditional methods often fail due to different reasons. For instance, as traditional methods do not recognize multiple contexts, they are not able to address the issue associated with multiple contexts. The traditional approaches also do not recognize dependency relations existing between/among multiple contexts so that different scenarios associated with multiple contexts can be handled accordingly in order to correctly identify insightful phrases for each independent context. Furthermore, as traditional approaches do not distinguish situations where independent context may be bound with or without a common word, they fail to separately address each scenario appropriately in order to correctly identify meaningful phrases.

The present teaching addresses the issues associated with traditional methods discussed above. FIG. 1 depicts an exemplary high level system diagram of a framework 200 for extracting relevant and insightful phrases from an input text, in accordance with an embodiment of the present teaching. In this illustrated embodiment, the framework 200 comprises an input text preprocessor 200, a multiple context detector 210, a context dependency detector 220, a context bounding determiner 240, a phrase extraction engine 250, and a phrase selection model 270. In framework 200, the phrase extraction engine 250 is provided for identifying candidate phrases for each independent context detected from the input text. The phrase selection model 270 is provided for select a best (most insightful) phrase from the candidate phrases.

To detect each independent context, the multiple context detector 210 is provided to detect whether the given input text has multiple contexts therein. If there are multiple contexts detected, the context dependency detector 220 determines whether any of the detected multiple contexts is dependent on some other context(s), i.e., determining that the context is actually not an independent context. A determination of such a dependency may be performed based on some pre-determined dependency criteria specified in 230. For example, multiple contexts may be detected from input text "you can download the app called advanced task killer it is free and kills all the running apps and saves your battery life," e.g., contexts associated with "app" and "battery." However, as the purpose of the "app" is to save the life span of the "battery," these two contexts are not independent (or dependent on each other). In this case, both of these two contexts are used as a single context in extracting relevant phrases, according to the present teaching.

There are other situations that may impact how phrase extraction is performed. Some contexts among multiple contexts detected from an input text may have a common bounding word. For instance, input text "awesome apps and camera" has two contexts, i.e., "apps" and "camera," but they have a common bounding word "awesome." In this case, the input text is inherently ambiguous as adjective "awesome" may be associated with either or both contexts so that phrases extracted in either situation cannot resolve the inherent ambiguity to cause further confusion. As such, the input text cannot be reasonably split to help to provide insightful information. In this situation, the entire input text may be used as a candidate phrase (in some applications) for further processing in selecting insightful phrases (discussed below) with respect to topic or sentiment related features. In some embodiments, the input text may be dropped from further processing related to phrase extraction.

According to the present teaching, if a context detected from an input text is not dependent on another context(s) and does not share a common bounding word with another context, it is considered an independent context. A single context detected from an input text is also an independent context. As discussed herein, the phrase extraction engine 250 extracts the top k candidate phrases with respect to each independent context. When there are multiple independent contexts in the input text, the phrase extraction engine 250 may be invoked multiple times, each time with an independent context from which candidate phrases are to be extracted.

Figure 2:
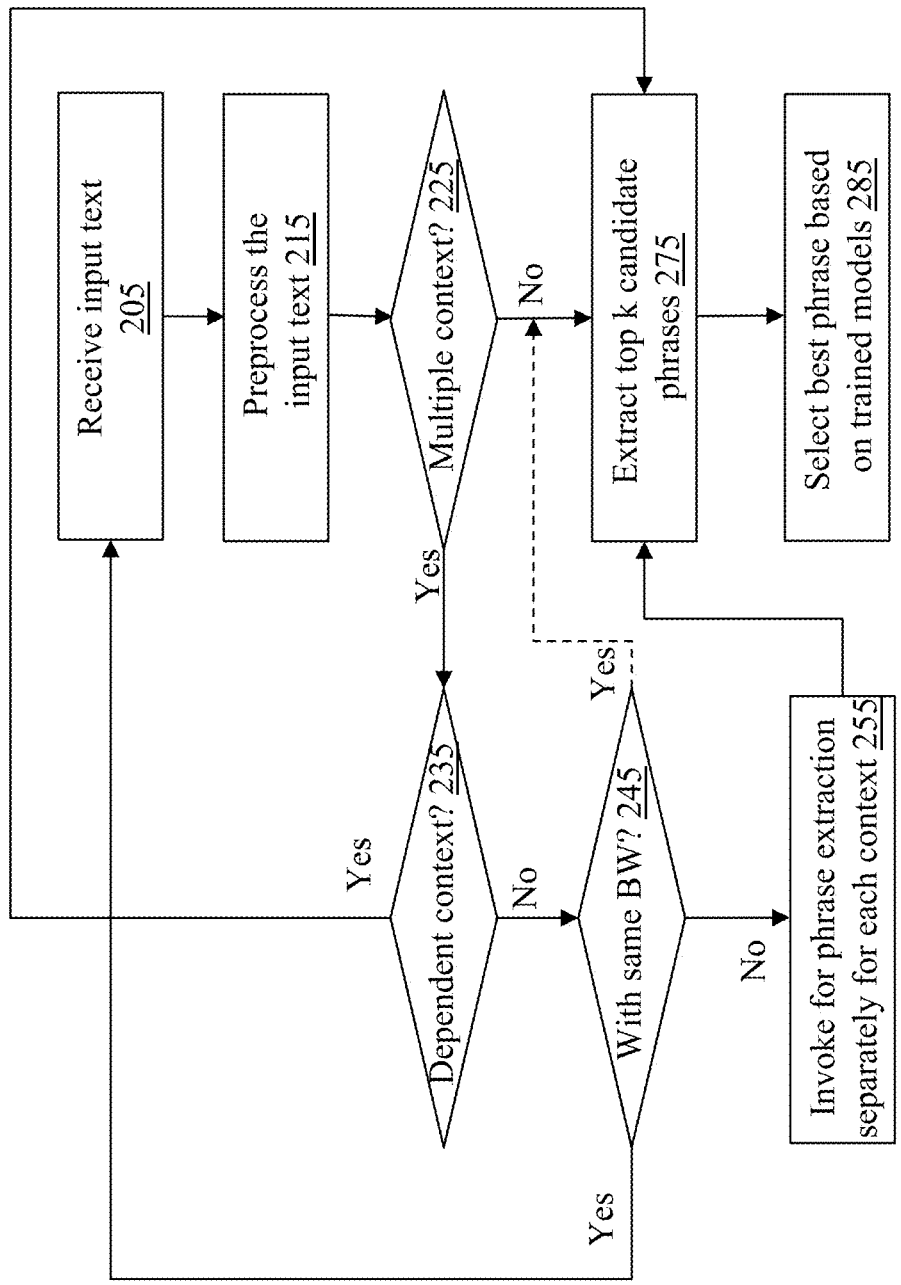
FIG. 2 is a flowchart of an exemplary process for a framework for extracting relevant phrases from an input text, in accordance with an embodiment of the present teaching.

FIG. 2 is a flowchart of an exemplary process for the framework 200 for extracting relevant phrases from an input text, in accordance with an embodiment of the present teaching. When the input text preprocessor 200 receives, at 205, an input text, it preprocesses, at 215, the input text (e.g., decapitalizing the characters and removing punctuation, etc.). The processed text is sent to the multiple context detector 210, which determines, at 225, whether multiple contexts exist. In some embodiments, multiple context detection may be achieved via topic detection. That is, topics may be detected from the input text and if there are multiple detected topics, there are multiple contexts. If a single context is detected, the multiple context detector 210 invokes the phrase extraction engine 250 to extract, at 275, top k candidate phrases from the single context.

If multiple contexts are detected from the input text, the multiple context detector 210 activates the context dependency detector 220 to determine, at 235, whether any of the multiple contexts is dependent on another context. For any contexts that are dependent on each other, the context dependency detector 220 invokes the phrase extraction engine 250 to extract, at 275, top k candidate phrases from the dependent contexts. For any context(s) that are not dependent, the context bounding determiner 240 is activated to determine, at 245, whether there are contexts sharing a common bounding word. If so, there may be different ways to handle the situation. In some embodiments, the bound contexts are dropped from further processing for phrase extraction. In this case, the process moves to step 205 (see link to step 205). In some embodiments, the bound contexts may be treated as one context for phrase extraction so that the process moves to step 275 (see link to step 275). If no context is bound with another context by a common word, the multiple contexts are independent. Given that, the context bounding determiner 240 invokes, at 255, the phrase extraction engine 250, each time with one of the independent contexts, to extract top k candidate phrases therefrom. After the phrase extraction engine 250 extracts top k candidates for each of the independent context(s), the candidate phrases are sent to the phrase selection model 270 for selecting a best phrase for each of the independent context.

Figure 3:
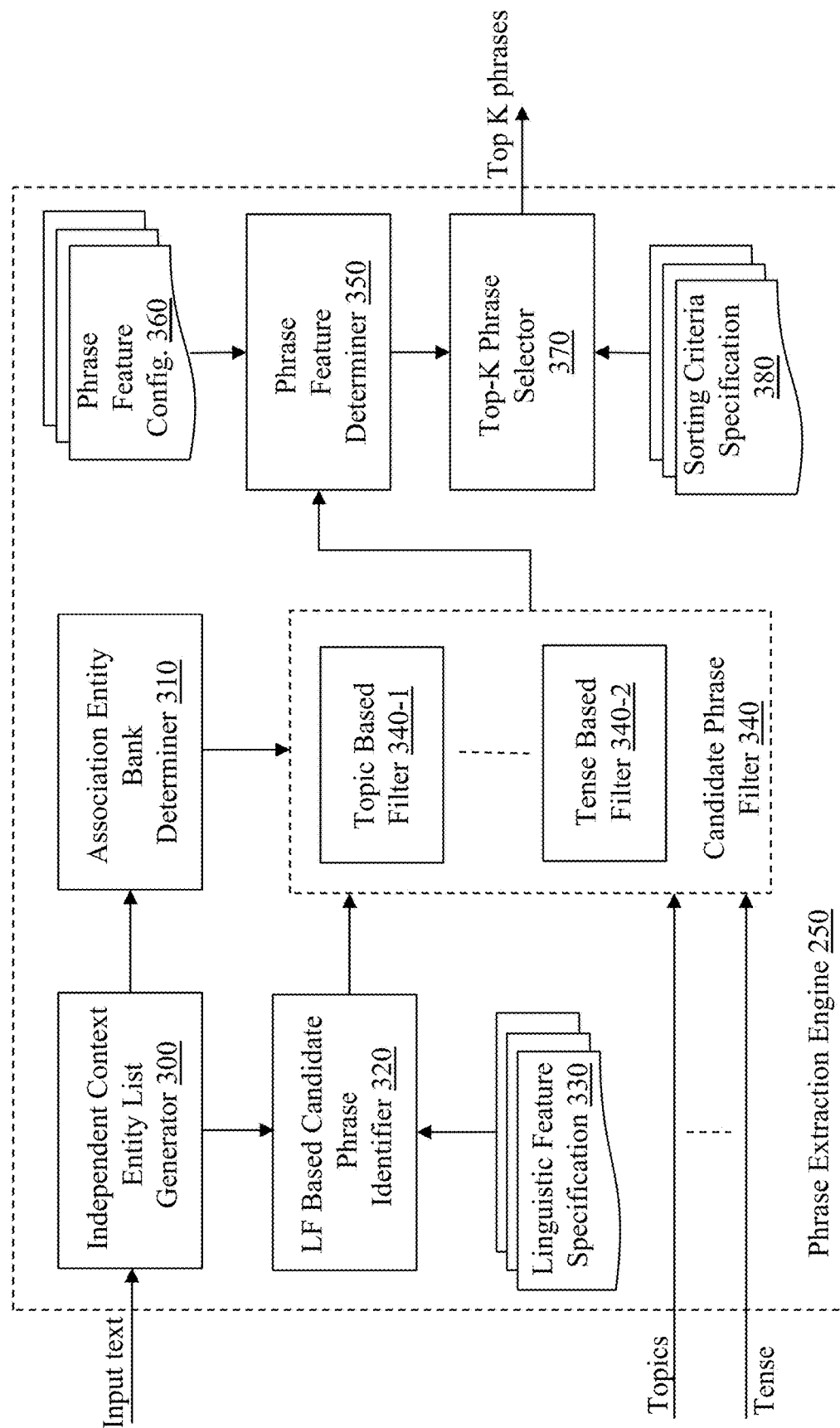
FIG. 3 depicts an exemplary high level system diagram of a phrase extraction engine, in accordance with an embodiment of the present teaching.

FIG. 3 depicts an exemplary high level system diagram of the phrase extraction engine 250, in accordance with an embodiment of the present teaching. In this illustrated embodiment, the phrase extraction engine 250 takes inputs, such as an independent context (including one formed by multiple dependent contexts), topics associated with the context, as well as other features such as tense in the context (e.g., past, present, or future), etc. and outputs top k candidate phrases extracted from the given context. The phrase extraction engine 250 comprises an independent context entity list generator 300, an association entity bank determiner 310, a linguistic feature (LF) based candidate phrase identifier 320, a candidate phrase filter 340, a phrase feature determiner 350, and a top k phrase selector 370.

The independent context entity list generator 300 is provided for establishing a list of entities identified from the input independent context. The entity/association bank determiner 310 is provided for generating a list of associated entities based on entities identified from the input context. For example, if entity "app" is detected from an input context, the association entity bank determiner 310 may generate entities as a list of association such ['complaint', 'navigation', 'killer']. For entity "battery," its association entity list may be, e.g., ['last', 'dies']. The entity list and/or the association entity bank(s) may be used to filter phrases as discussed below.

The LF based candidate phrase identifier 320 is provided for generating an initial list of candidate phrases based on linguistic features specified in 330. In some embodiments, the linguistic features may include, e.g., 5-grams, 10-grams, or 15-grams. Each type of linguistic features may be applied for capturing some insights from different types of phrases. For instance, 5-gram LF may be used to capture insights in shorter phrases, while 15-gram LF may be used to capture insights in long phrases. For example, assume that a preprocessed input context is "use my phone a lot so the battery dies quickly even with the app killer." This input text has a single context because topics "app" and "battery" are dependent of each other. Using this example, 5-gram LF based candidate phrases may be extracted as following:

'lot so the battery dies',
'quick even with the app',
'lot so the battery',
'battery dies quick',
'battery dies',
'phone a lot', and
'app killer', 'dies quick'

Using 15-gram LF, a different set of phrases may be identified as follows:

'phone a lot so the battery dies quick even with the app killer',
'phone a lot so the battery dies quick even with the app',
'lot so the battery dies quick even with the app killer',
'lot so the battery dies quick even with the app',
'battery dies quick even with the app killer',
'phone a lot so the battery dies quick',
'battery dies quick even with the app',
'phone a lot so the battery', 'lot so the battery dies',
'battery dies quick', and
'lot so the battery'

The initial set of phrase candidates generated based on LFs may be filtered by the candidate phrase filter 340 based on different criteria. In the embodiment illustrated in FIG. 3, the initial set of phrase candidates may be filtered based on, e.g., entity list (from the independent context entity list generator 300), association entity list (from the association entity bank determiner 310), as well as the input topics, . . . , tense of the context. Specifically, the candidate phrase filter 340 may include a topic based filter 340-1, . . . , and a tense based filter 340-2. The topic-based filter 340-1 may be provided to filter out those phrases that have entities or associated entities that are not consistent with the input topics detected from the input text, while the tense-based filter 340-2 may be deployed to filter out initial candidate phrases that have inconsistent tense information as what is detected from the input text. The candidate phrase filter 340 generates a list of filtered candidate phrases.

Using the above example of input text "use my phone a lot so the battery dies quick even with the app killer," the filtered candidate list includes the below 4 candidate phrases:

'phone a lot so the battery dies quick even with the app killer',
'phone a lot so the battery dies quick even with the app',
'lot so the battery dies quick even with the app killer, and
'battery dies quick even with the app killer'

Such filtered candidate phrases are then sent to the phrase feature determiner 350 so that various phrase features may be computed for each of them. Such phrase features are used to select top k phrases.

Figure 4B:
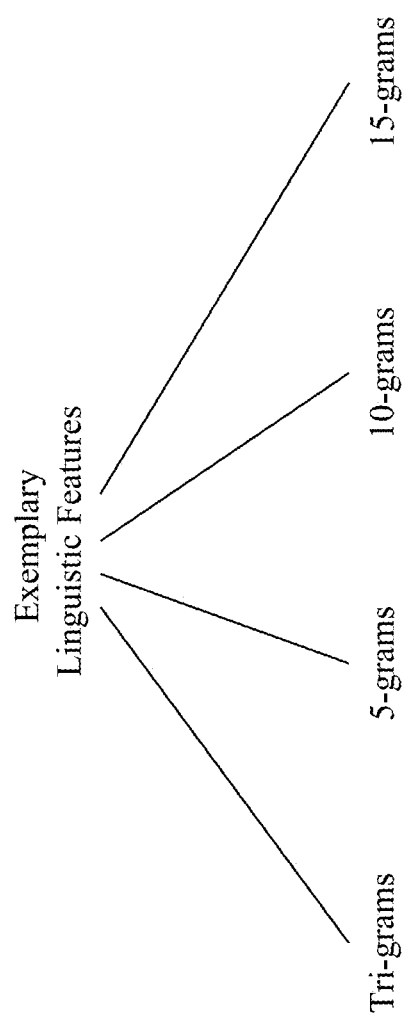
FIG. 4B shows exemplary linguistic features used in identifying relevant phrases, in accordance with an embodiment of the present teaching.

FIG. 4A shows exemplary types of features computed for filtered phrases, in accordance with an embodiment of the present teaching. As illustrated, phrase features may include, e.g., linguistic features, part-of-speech (POS) weight, length of phrase, . . . , or sentiment score. Different features may be used to characterize different aspects of a phrase and together they represent a phrase in a feature space. For instance, as discussed herein, linguistic features may correspond to tri-gram, 5-gram, 10-gram, . . . , 15-gram, etc., as shown in FIG. 4B.

Figure 4C:
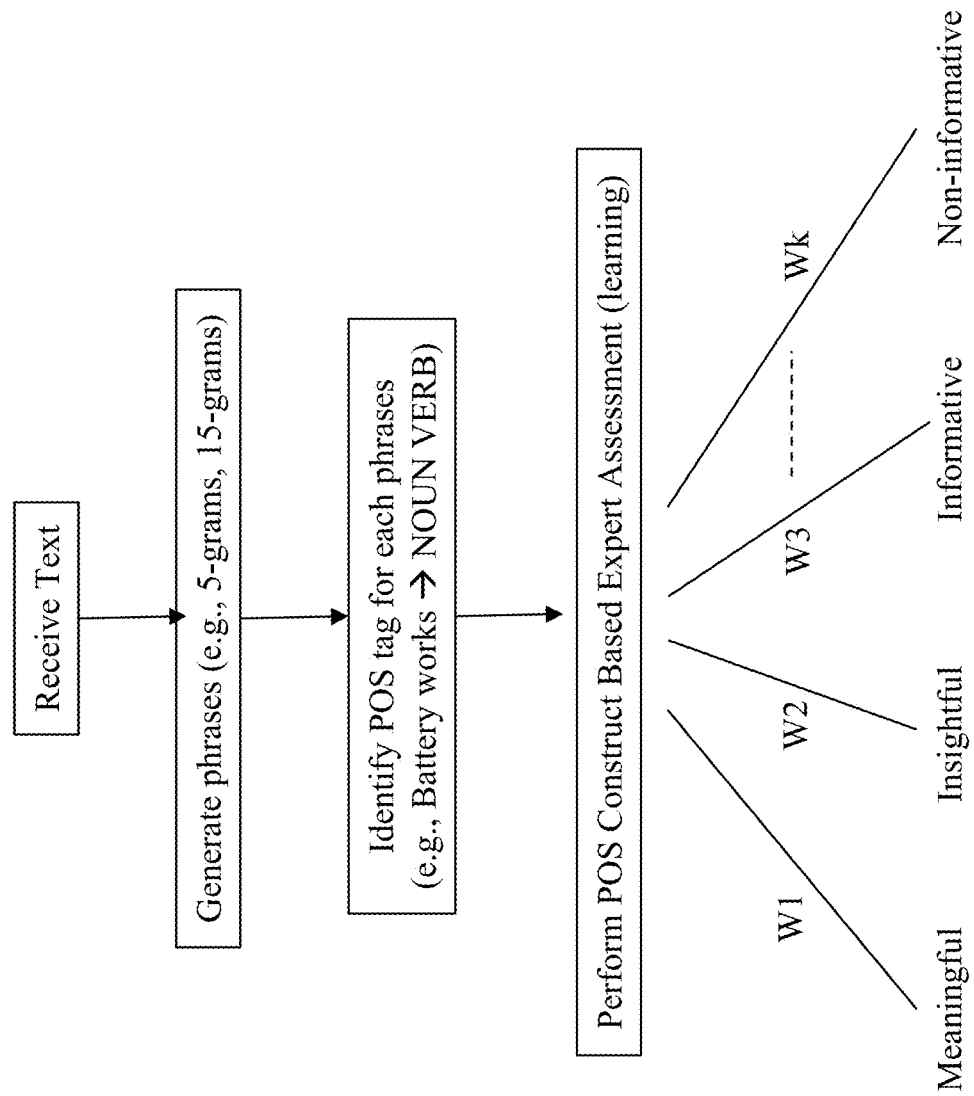
FIG. 4C shows an exemplary process of assigning parts-of-speech (POS) weights to phrases of different classes, in accordance with an exemplary embodiment of the present teaching.

Phrase feature related to a POS weight assigned to a phrase may be provided to capture certain insight of a phrase based on the linguistic constructs of the phrase. To capture that, the POS weights as applied to different linguistic constructs of phrases may be learned based on, e.g., human experts' knowledge. FIG. 4C shows an exemplary process of learning POS weights associated with different linguistic constructs of phrases, in accordance with an exemplary embodiment of the present teaching. As shown, given an input text, phrases may be generated, e.g., based on LFs such as 5-grams or 15-grams. For each phrase, POS tags may be accordingly generated. For example, if a phrase is "battery works," its POS tags are "NOUN VERB," which represents the linguistic construct of the phrase. Similarly, if a phrase is "battery camera," the POS tags for this phrase is "NOUN NOUN." In some embodiments, the linguistic constructs that have POS tags representing that the constructs have both an actor and an action (i.e., insightful) weigh more than linguistic constructs that are without POS tag for verbs (although may be meaningful but in general not insightful).

The POS tags for different phrases with respective linguistic constructs may then be evaluated by experts based on knowledge and POS weights may be initially assigned to these phrases. For instance, as shown in FIG. 4C, phrases may be classified into, e.g., insightful, meaningful, informative, non-informative, . . . , and any combination thereof. For each class, a weight may be pre-defined by, e.g., an expert. The POS weight to each class may reflect the level of insightfulness associated with the class. For instance, the class of insightful phrases may be assigned the highest POS weight and the class of meaningful phrases may be assigned the second highest POS weight, etc. For example, if a phrase is deemed meaningful, its POS weight may be W1 (e.g., 2.0); if a phrase is considered insightful, its POS weight may be W2 (e.g., 3.0); if a phrase is informative, its POS weight may be W3 (e.g., 1.0); if a phrase is considered non-informative, its POS weight may be W4 (e.g., 0.5). The POS weight for any combination of these situations, e.g., the combination of meaningful and insightful or meaningful and informative, etc., may be determined based on the corresponding combination of the respective POS weights of different classes. For instance, if a phrase is both meaningful and insightful, the POS weight assigned to it may be 4.0. If a phrase is both meaningful and informative, its POS weight may be 2.5.

In some embodiments, initial POS weights may be assigned to some phrases by experts with knowledge and the linguistic constructs represented by POS tags of such weighted phrases may be used for machine learning to learn how to obtain generalized knowledge on relationship between POS weights and phrases.

Some exemplary POS weights assigned by experts based on knowledge to different LF based phrases are provided below. The table below illustrates exemplary POS weights assigned to 5-gram phrases:

```
"'PROPN', 'NOUN', 'AUX', 'VERB'": 3,
"'NOUN', 'NOUN', 'NOUN'": 2,
"'VERB', 'DET', 'ADJ', 'NOUN'": 2,
"'NOUN', 'ADP', 'NOUN'": 2,
"'VERB', 'DET', 'NOUN', 'NOUN'": 3,
"'NOUN', 'AUX', 'VERB'": 2,
"'VERB', 'ADP', 'PROPN'": 2,
"'ADJ', 'NOUN', 'NOUN'": 2,
"'VERB', 'ADJ', 'NOUN'": 2,
"'VERB', 'DET', 'PROPN'": 2,
"'VERB', 'NOUN', 'NOUN'": 2,
"'NOUN', 'AUX', 'ADJ'": 2,
"'VERB', 'ADP', 'ADJ', 'NOUN'": 2,
"'VERB', 'ADP', 'NOUN', 'NOUN'": 2,
"'VERB', 'DET', 'PROPN', 'NOUN'": 3,
"'VERB', 'ADP', 'DET', 'PROPN'": 2,
"'VERB', 'PROPN', 'NOUN'": 2,
"'VERB', 'ADP', 'ADP', 'NOUN'": 2,
"'NOUN', 'VERB', 'AUX', 'VERB'": 2,
"'NOUN', 'PROPN', 'NOUN'": 2,
"'PROPN', 'PROPN', 'VERB'": 2,
"'NOUN', 'AUX', 'AUX', 'VERB'": 2,
"'VERB', 'PART', 'VERB', 'NOUN'": 2,
"'VERB', 'PROPN', 'PROPN'": 2,
"'NOUN', 'VERB', 'ADJ'": 2,
"'VERB', 'ADJ', 'NOUN'": 2
```

The table below illustrates exemplary POS weights assigned to 15-gram phrases:

```
"'NOUN', 'PART', 'VERB', 'DET', 'NOUN'": 3,
"'VERB', 'DET', 'NOUN', 'ADP', 'DET', 'ADJ', 'NOUN'": 3,
"'VERB', 'DET', 'NOUN', 'NOUN'": 3,
"'VERB', 'DET', 'NOUN', 'NOUN', 'ADP', 'DET', 'NOUN'": 3,
"'VERB', 'DET', 'NOUN', 'NOUN', 'NOUN'": 3,
"'VERB', 'DET', 'NOUN', 'ADP', 'PROPN'": 3,
"'NOUN', 'ADP', 'VERB', 'DET', 'NOUN'": 3,
"'VERB', 'DET', 'NOUN', 'ADP', 'DET', 'NOUN', 'NOUN'": 3,
"'VERB', 'ADP', 'DET', 'NOUN', 'ADP', 'NOUN'": 3,
"'ADJ', 'PART', 'VERB', 'DET', 'NOUN'": 3,
"'NOUN', 'PART', 'VERB'": 2,
"'VERB', 'DET', 'NOUN'": 2,
"'VERB', 'ADP', 'DET', 'ADJ', 'NOUN'": 2,
"'ADJ', 'NOUN', 'ADP', 'DET', 'NOUN'": 2,
"'VERB', 'DET', 'NOUN', 'ADP', 'NOUN'": 2,
"'VERB', 'NOUN', 'ADP', 'DET', 'NOUN'": 2,
"'NOUN', 'PART', 'VERB', 'DET', 'NOUN'": 2,
"'VERB', 'DET', 'ADJ', 'NOUN', 'NOUN'": 2
"'VERB', 'DET', 'ADJ', 'NOUN', 'ADP', 'DET', 'NOUN'": 2,
"'VERB', 'DET', 'NOUN', 'ADP', 'DET', 'ADJ', 'NOUN'": 2,
"'VERB', 'DET', 'NOUN', 'NOUN', 'ADP', 'DET', 'NOUN'": 2,
"'VERB', 'DET', 'NOUN', 'NOUN', 'NOUN'": 2,
"'VERB', 'DET', 'NOUN', 'ADP', 'PROPN'": 2,
"'NOUN', 'ADP', 'VERB', 'DET', 'NOUN'": 2,
"'ADJ', 'PART', 'VERB', 'DET', 'NOUN'": 3,
"'NOUN', 'ADP', 'NOUN'": 2,
"'VERB', 'DET', 'NOUN', 'ADP', 'DET', 'NOUN', 'NOUN'": 2,
"'NOUN', 'NOUN', 'ADP', 'DET', 'ADJ', 'NOUN'": 2,
"'VERB', 'ADP', 'DET', 'ADJ', 'NOUN', 'NOUN'": 2,
"'VERB', 'ADP', 'DET', 'NOUN', 'ADP', 'NOUN'": 2,
"'NOUN', 'ADP', 'NOUN', 'ADP', 'DET', 'NOUN'": 2,
"'ADJ', 'PART', 'VERB', 'DET', 'NOUN'": 2
```

Figure 4D:
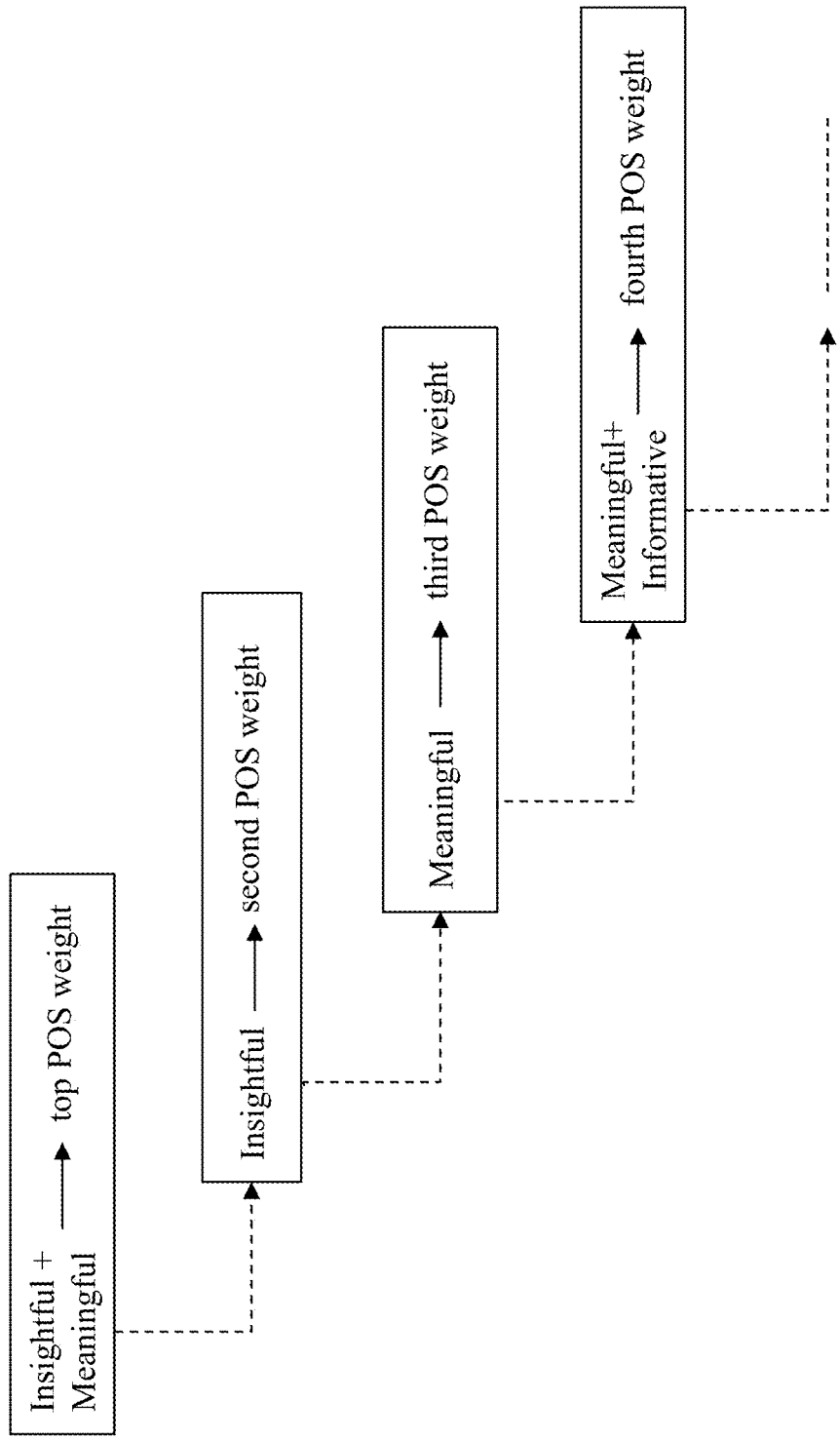
FIG. 4D shows an exemplary priority hierarchy of POS weights for different phrase classifications, in accordance with an embodiment of the present teaching.

FIG. 4D shows an exemplary priority hierarchy of POS weights for different phrase classifications, in accordance with an embodiment of the present teaching. In this example, phrases classified as insightful are assigned top level of POS weight, phrases classified as meaningful may be assigned as second level of POS weight, phrases classified as informative may be assigned a third level of POS weight, and phrases classified as non-informative may be assigned the lowest level of POS weight.

As shown in FIG. 4A, in addition to POS weights assigned to phrases, other phrase related features, such as lengths of phrases or sentiment scores, may also be determined by the phrase feature determiner 350 in selecting top k phrases from candidate phrases. Each phrase may be associated with a length measure determined, e.g., based on the number of words in the phrase. Sentiment expressed by a phrase may also be computed using any approaches, either existing today or made available in the future. The linguistic features, the POS weights, the phrase lengths, and sentiment scores of phrases may then be used by the top-k phrase selector 370 to select k best phrases from filtered candidate phrases from the candidate phrase filter 340. It is understood that although the discussion herein discloses specific types of phrase features, it is merely for illustrative purposes without limiting the scope of the present teaching. That is, any other features characterizing phrases may also be computed and used for selecting top k phrases. Such features to be used for selection may be determined based on the needs of specific applications of the present teaching.

Figure 4E:
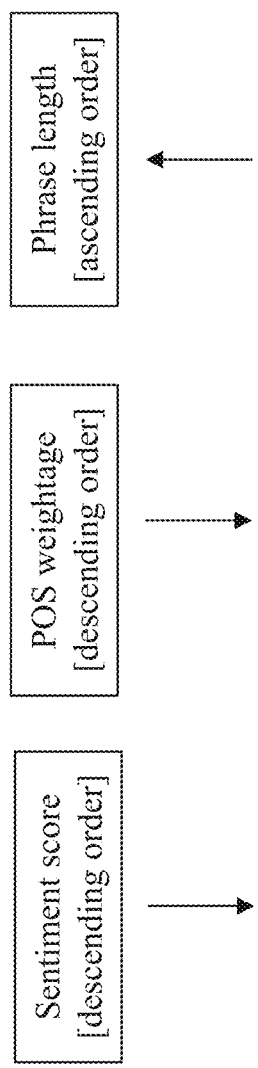
FIG. 4E illustrates an exemplary scheme for sorting phrases extracted from an input text, in accordance with an embodiment of the present teaching.

In some embodiments, the top-k phrase selector 370 may select top k phrases based on certain criteria specifying preferences of the features used. For example, based on application needs, phrases of a shorter length may be preferred, phrases exhibiting a stronger sentiment (represented by a higher sentiment score) may be preferred, or phrases with higher POS weights may be preferred. Such specified criteria may be stored in storage 380 and can be reconfigured dynamically based on application needs. This is shown in FIG. 4E with exemplary criteria of sorting phrases according to their phrase features, in accordance with an embodiment of the present teaching. Taking the above 4 candidate phrases generated from input context "use my phone a lot so the battery dies quick even with the app killer," these candidate phrases have (1) sentiment score of 0.56, (2) POS weight of 2.0, and (3) respective phrase lengths of (13, 12, 11, 8). In some embodiments, the sorting criteria used to rank these candidate phrases may be to sort the filtered candidate phrases according to the descending order of their sentiment scores, the descending order of their POS weights, and the ascending order of their phrase lengths. Applying this exemplary sorting criteria to the above example 4 filtered candidate phrases, the resultant top 2 (k=2) phrases are:

'battery dies quick even with the app killer' and
'lot so the battery dies quick even with the app killer'

It can be seen that when other conditions are similar (i.e., same POS weights and same sentiment scores), the exemplary selection criteria prefer shorted phrases (e.g., more succinct, more precise).

Figure 5:
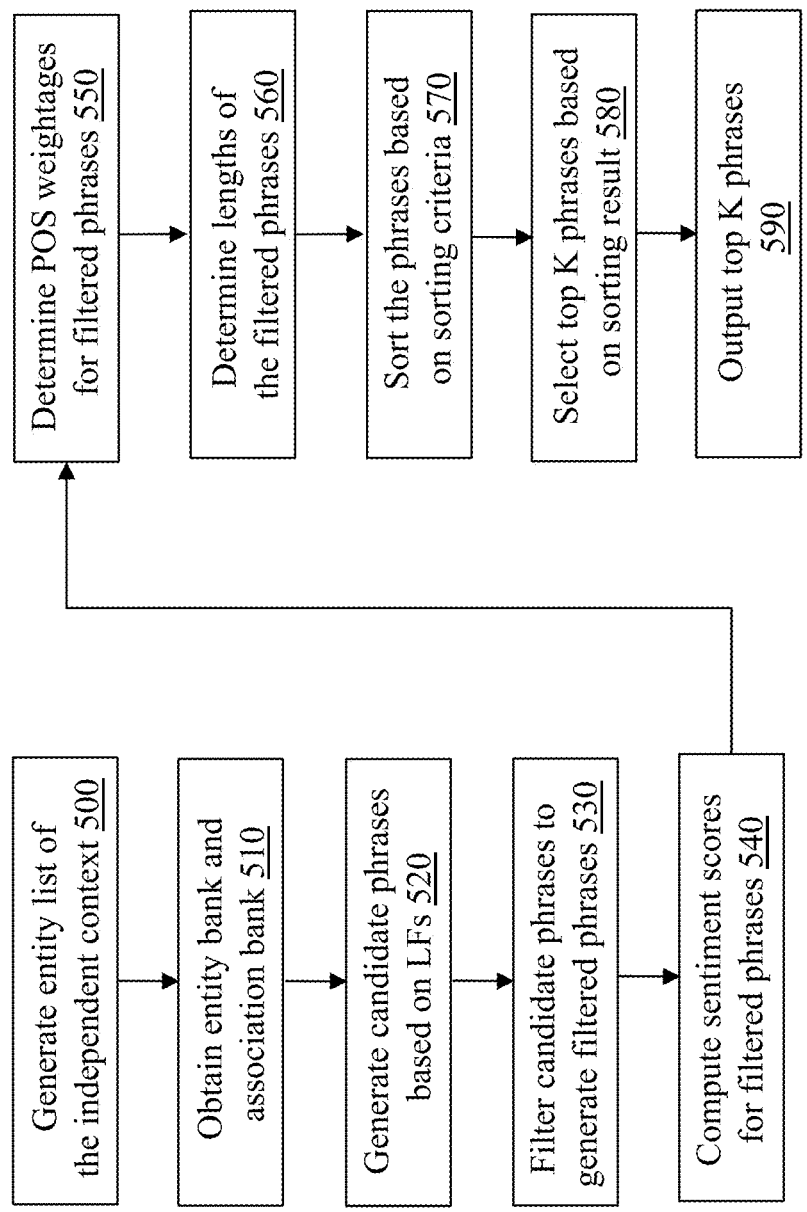
FIG. 5 if a flowchart of an exemplary process of a phrase extraction engine, in accordance with an embodiment of the present teaching.

FIG. 5 is a flowchart of an exemplary process of the phrase extraction engine 250, in accordance with an embodiment of the present teaching. Upon receiving a context identified from an input text, the independent context entity list generator 300 generates, at 500, an entity list based on which, the association entity bank is determined, at 510, by the association entity bank determiner 310. The LF based candidate phrase identifier 320 generates, at 520, an initial list of candidate phrases based on linguistic features specified in 330. Such initial list of candidate phrases is then filtered, at 530, by the candidate phrase filter 340 based on, e.g., entity list, association entity bank, input topics extracted from the input text, and the tense of the input context. The filtering operation produces a list of filtered candidate phrases which are then sent to the phrase feature determiner 350 so that their features may be computed. The sentiment scores of the filtered candidate phrases are computed at 540, the POS weights associated with each of the filtered candidate phrases are determined at 550, and the lengths of the filtered candidate phrases are determined at 560. Based on such computed phrase features, the top-k phrase selector 370 ranks the filtered candidate phrases by sorting the phrases, at 570, based on sorting criteria specified in 380. According to the sorting result, top k phrases may then be selected at 580 by the top-k phrase selector 370. Such selected top k phrases are then output at 590.

Figure 6A:
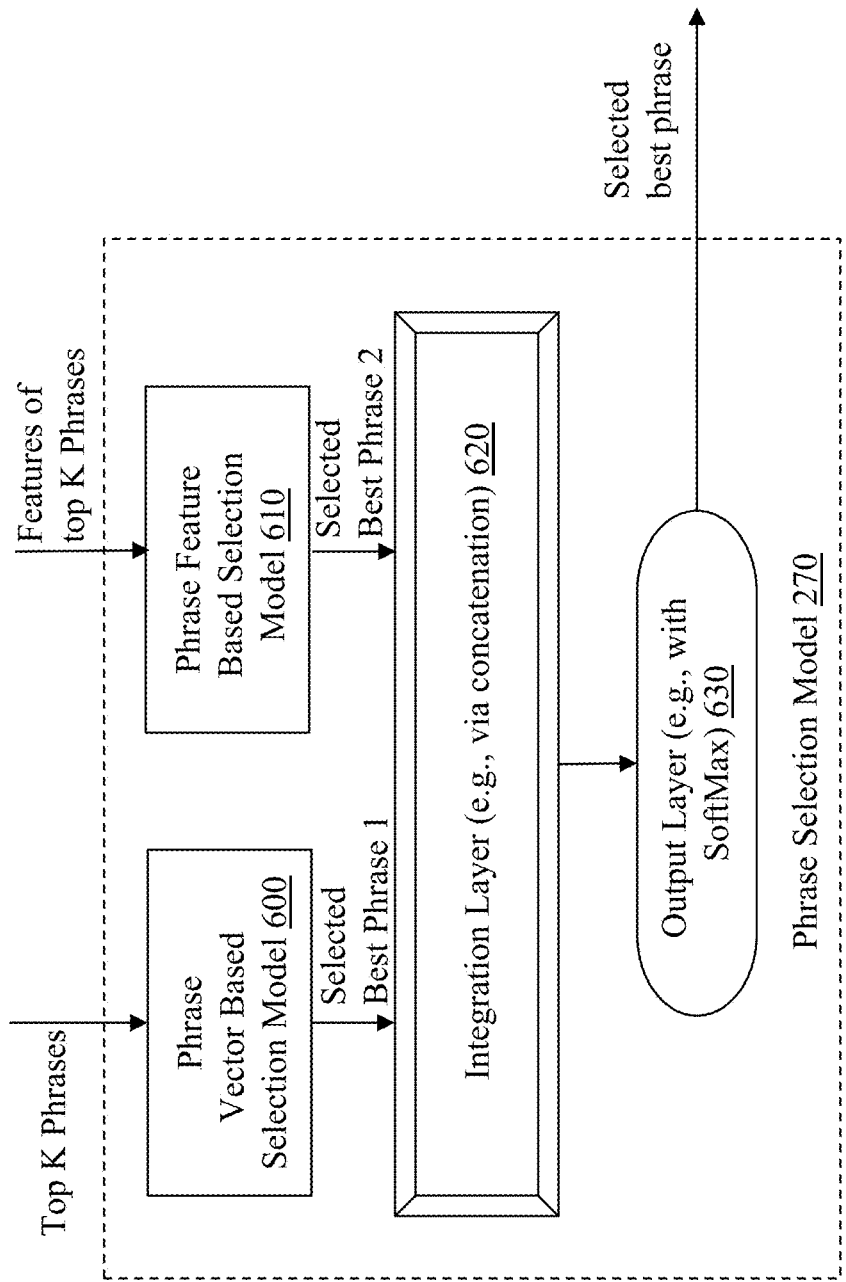
FIG. 6A depicts an exemplary high-level architecture of a deep learned phrase selection model, in accordance with an embodiment of the present teaching.

As discussed herein, the selected top k phrases may then be provided to the phrase selection model 270 to select a most insightful phrase from the top k phrases, as shown in FIG. 1. FIG. 6A depicts an exemplary high-level architecture of a deep learning model as an implementation of the phrase selection model 270, in accordance with an embodiment of the present teaching. In this illustrated embodiment, the phrase selection model 270 is a hybrid model learned via machine learning that integrates diverse phrase selection models established based on different types of features. Specifically, the illustrated phrase selection model 270 via machine learning corresponds to a multi-layer model having a first layer with a phrase vector based selection model 600 and a phrase feature based selection model 610, a second layer 620 for integration of the selection results from the two models in the first layer, and an output layer 630 for producing the selected best (e.g., most insightful) phrase. The phrase vector based selection model 600 selects a best phrase 1 based on a vector representation generated based on the content of each phrase. For example, such a vector may be generated in a high dimensional space defined by, e.g., vocabularies so that the vector for each phrase may correspond to a sparsely populated vector. The phrase feature based selection model 610 may perform the selection of a best phrase 2 based on features that are computed to characterize each phrase such as length of a phrase, or POS weight of the phrase, etc. The selected best phrases 1 and 2 may or may not correspond to the same phrase. These two selection results are then integrated at the integration layer 620 to produce an integrated result. Such integrated result may then be processed by the output layer to generate an output selected best phrase.

The most insightful phrase for each of the independent context(s) selected according to the present teaching may be used to reflect the meaning of that independent context. For example, for input context "You can download the app called advanced task killer, it is free it kills all the running apps and saves your battery life," multiple contexts ("app" and "battery") are detected. However, because the contexts depend on each other (both related to save battery's life), it is processed as a single context and the selected most insightful phrase is "download the app called advanced task killer it is free it kills all the running apps and saves your battery life." In another example, for input text "Love the games and hate the apps," two contexts are also detected on "games" and "apps." As there is no dependency between the two contexts, each context is processed separately and a most insightful phrase is selected for each of the contexts, producing "love the games" for context on "games" and "hate apps" for context on "apps." As can be seen, the selected most insightful phrases accurately represent the intended meaning of the input text on each of the contexts. As such, the insightful phrases extracted according to the present disclosure facilitate an understanding of the input text.

In many applications, a correct understanding of an input text, such as a customer's feedback on a product or service, is important. It may help a company to become aware of certain issues associated with some aspects of a product. For example, through an understanding of customers' feedback, a product may still have issues on some features requiring further improvement to make customers satisfied. As another example, the company may find out that some product features may be very popular. Such knowledge may enable a recommendation engine to refine its operation to recommend products/services based on features that are popular.

In some embodiments, the machine learned phrase selection model 270 may be implemented via deep learning using a neural network such as an artificial neural network (ANN) with different layers implemented as corresponding sub neural networks.

Figure 6B:
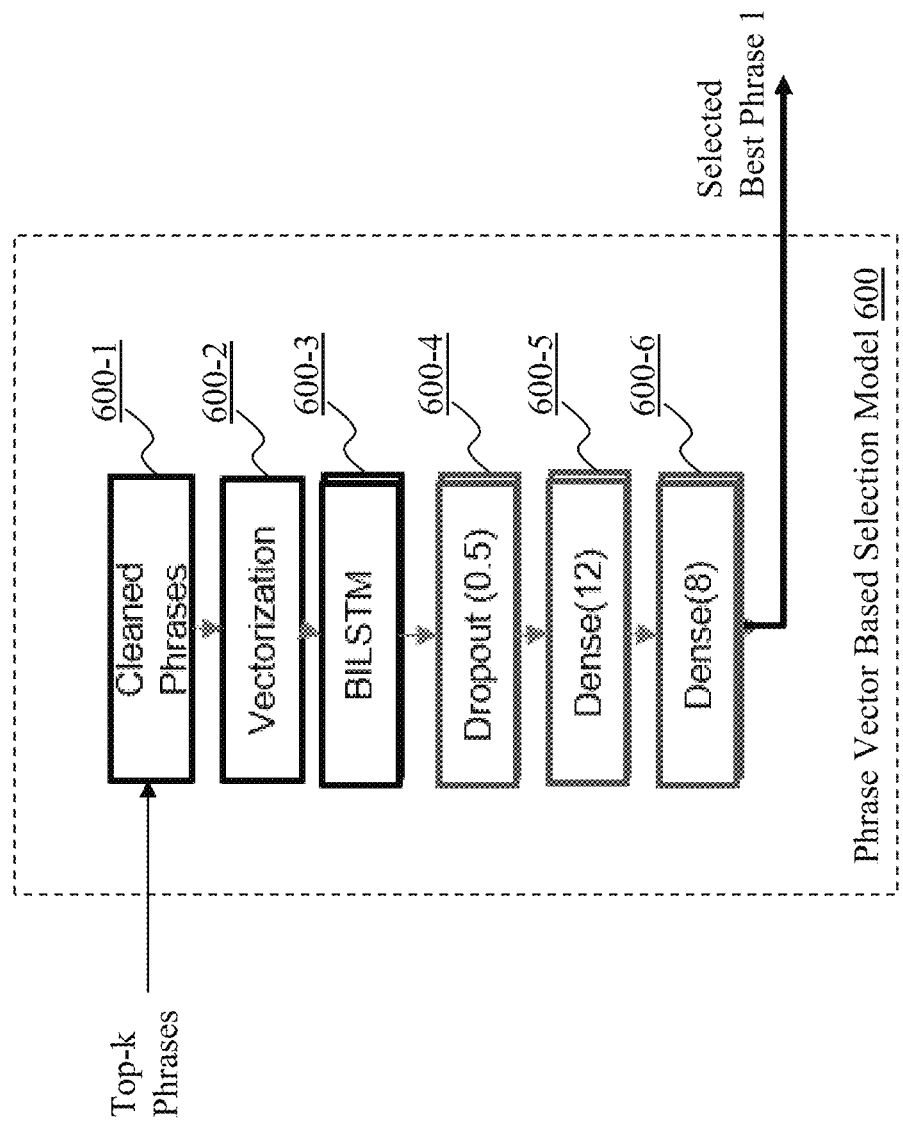
FIG. 6B depicts an exemplary artificial neural network (ANN) architecture of a phrase vector based selection model, in accordance with an embodiment of the present teaching.

FIG. 6B depicts an exemplary ANN architecture implementing a sub-ANN for the phrase vector based selection model 600, in accordance with an embodiment of the present teaching. In this exemplary implementation of the phrase vector based selection model 600, there are multiple sub-layers corresponding to a layer 600-1 for generating cleaned phrases based on input top k phrases, a layer 600-2 for generating phrase vectors for top k phrases, a layer 600-3 for bidirectional long-short term memory (BILSTM) sub-net, a dropout layer 600-4, a first dense layer 600-5, and a second dense layer 600-6 that output a best phrase 1 selected from the input top k phrases.

Figure 6C:
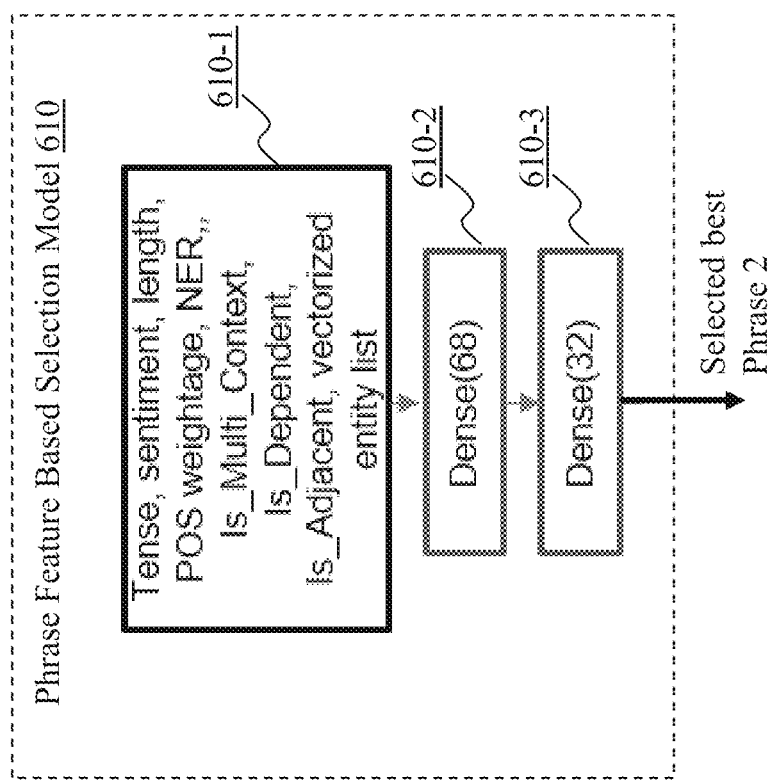
FIG. 6C depicts an exemplary ANN architecture of a phrase feature based selection model, in accordance with an embodiment of the present teaching.

FIG. 6C depicts an exemplary ANN architecture implementing the phrase feature based selection model 610, in accordance with an embodiment of the present teaching. In this exemplary implementation, there are also multiple layers, including an input layer 610-1, a first dense layer 610-2 with an exemplary operation parameter 68, and a second dense layer 610-3 with an exemplary operation parameter of 32. The input layer 610-1 takes various phrase features of top k phrases as input, including but is not limited to tense, sentiment scores, lengths, POS weights, an indication of whether the phrase is part of multiple contexts, whether a dependency relation exists, whether there are adjacent contexts, and a vectorized entity list, etc. Such inputs are processed in the ANN and are used to select a best phrase 2 from the input top k phrases. As depicted in FIG. 6A, selected best phrases 1 and 2 are then combined to produce a final result of a selected best phrase.

Figure 7:
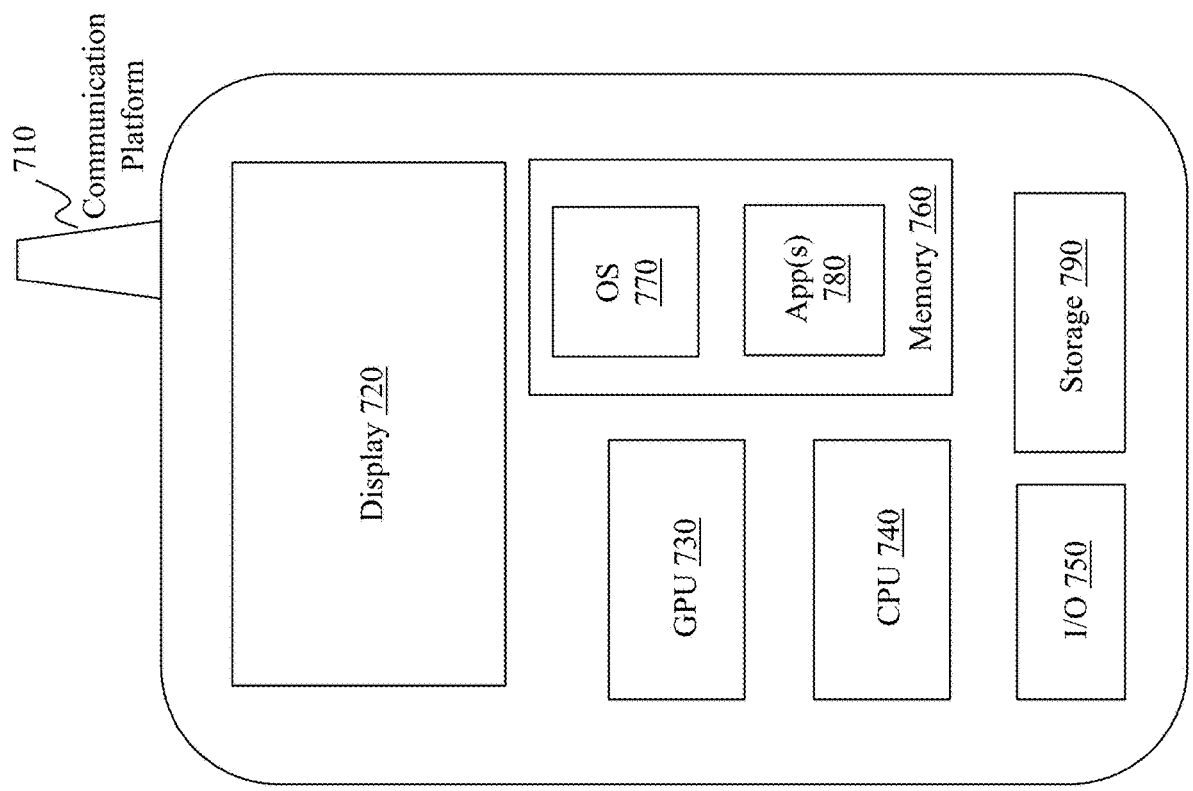
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but not limited to, a smart phone, a tablet, a music player, a handled gaming console, a global positioning system (GPS) receiver, and a wearable computing device, or a mobile computational unit in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 750. Any other suitable component, including but not limited to a system bus or a controller (not shown), may also be included in the mobile device 700. As shown in FIG. 7, a mobile operating system 770 (e.g., iOS, Android, Windows Phone, etc.) and one or more applications 780 may be loaded into memory 760 from storage 790 in order to be executed by the CPU 740. The applications 780 may include a user interface or any other suitable mobile apps for information exchange, analytics, and management according to the present teaching on, at least partially, the mobile device 700. User interactions, if any, may be achieved via the I/O devices 750 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 8:
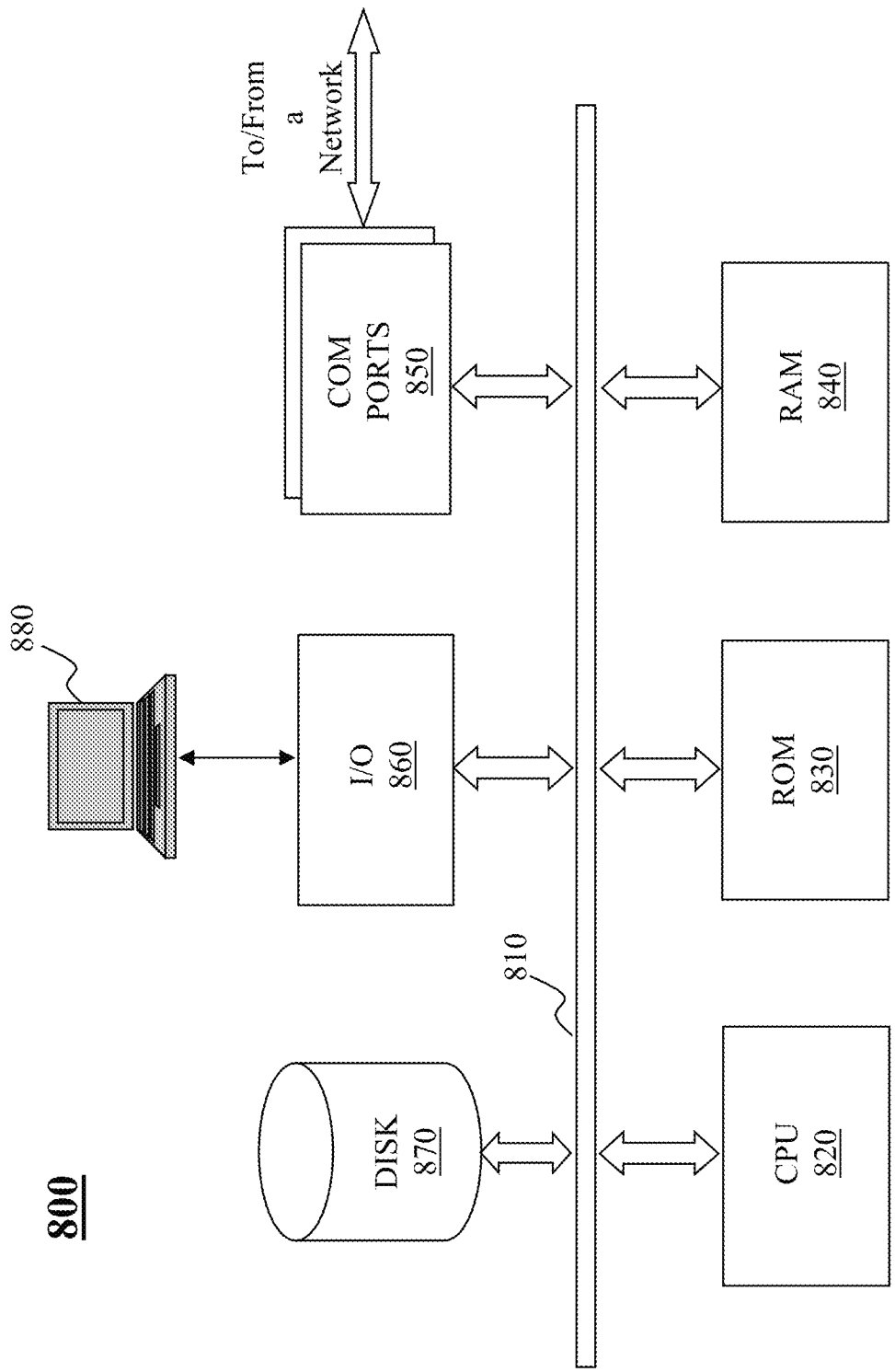
FIG. 8 is an illustrative diagram of an exemplary computing device architecture that may be used to realize a specialized system implementing the present teaching in accordance with various embodiments.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information processing and analytical method and system as disclosed herein may be implemented on a computer such as computer 800, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random-access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method, comprising:
   receiving, at a device, an input text;
   identifying, from the input text, first and second independent contexts without a common bounding word;
   for each of the independent contexts, generating top k phrases by:
      obtaining a plurality of initial phrases based on one or more linguistic features,
      filtering the plurality of initial phrases to generate a plurality of filtered candidate phrases,
      computing phrase features for each of the plurality of filtered candidate phrases, and
      identifying the top k phrases from the plurality of filtered candidate phrases based on their respective phrase features;
   selecting, for each of the independent contexts, a most insightful phrase from the top k phrases for the independent context based on an artificial neural network that integrates diverse phrase selection models established based on different types of phrase features; and
   facilitating an understanding of the input text based on the selected one or more most insightful phrases.

2. The method of claim 1, wherein identifying the independent contexts comprises:
   determining one or more topics included in the input text;
   identifying, with respect to each of the one or more topics, an individual context associated with the topic to generate corresponding contexts associated with the one or more topics;
   determining whether each of the corresponding contexts is an independent context based on whether the corresponding context depend on any other of the corresponding contexts or share a bounding word with any other of the corresponding contexts.

3. The method of claim 1, wherein the one or more linguistic features include x-gram extracted from the input text with x being an integer, wherein a specified x-gram with a smaller x is used to capture shorter phrases and a specified x-gram with a larger x is used to capture longer phrases with more details.

4. The method of claim 2, wherein filtering the plurality of initial phrases comprises:
   identifying a first list of entities for each of the plurality of initial phrases;
   obtaining a second list of association entities with respect to the first list of entities for each of the plurality of initial phrases;
   receiving information associated with the independent context on a topic and a tense associated the independent context;
   removing any of the plurality of initial phrases based on some pre-defined criteria defined based on the first list of entity, the second list of association entities associated with each of the plurality of initial phrases, as well as the topic and the tense associated with the independent context; and
   generating the plurality of filtered candidate phrases based on remaining initial phrases.

5. The method of claim 1, wherein identifying the top k phrases comprises:
   computing phrase features for each of the plurality of filtered candidate phrases;
   ranking the plurality of filtered candidate phrases by sorting the plurality of filtered candidate phrases according to a sorting criterion to produce a ranked list of filtered candidate phrases; and
   selecting the first k filtered candidate phrases from the ranked list of filtered candidate phrases as the top k phrases for the independent context.

6. The method of claim 5, wherein
   the phrase features include a length, a sentiment score, and a part-of-speech (POS) weight assigned to the filtered candidate phrase; and
   the sorting criterion specifies how to sequence the plurality of filtered candidate phrases according to an ascending or a descending order of each of the phrase features computed for the plurality of filtered candidate phrases.

7. The method of claim 1, wherein selecting a most insightful phrase from the top k phrases for each independent context comprises:
   receiving the top k phrases selected for the independent context;
   selecting a first most insightful phrase from the top k phrases based on a first phrase selection model;
   selecting a second most insightful phrase from the top k phrases based on a second phrase selection model;
   integrating the first and the second most insightful phrases via a deep learned phrase selection model to generate the best insightful phrase, wherein
   the first phrase selection model operates based on phrase vector representations for top k phrases, the second phrase selection model operates based on phrase features of the top k phrases.

8. A machine readable non-transitory medium having information recorded thereon, wherein the information, when read by the machine, causes the machine to perform the following steps:
   receiving an input text based on which at least one insightful phrase is to be extracted;
   identifying, from the input text, first and second independent contexts without a common bounding word;
   for each of the independent contexts, generating top k phrases by:

obtaining a plurality of initial phrases based on one or more linguistic features, filtering the plurality of initial phrases to generate a plurality of filtered candidate phrases, computing phrase features for each of the plurality of filtered candidate phrases, and identifying the top k phrases from the plurality of filtered candidate phrases based on their respective phrase features; selecting, for each of the independent contexts, a most insightful phrase from the top k phrases for the independent context based on an artificial neural network that integrates diverse phrase selection models established based on different types of phrase features, and facilitating an understanding of the input text based on the selected one or more most insightful phrases.

9. The medium of claim 8, wherein the step of identifying the independent contexts comprises:

determining one or more topics included in the input text;

identifying, with respect to each of the one or more topics, an individual context associated with the topic to generate corresponding contexts associated with the one or more topics;

determining whether each of the corresponding contexts is an independent context based on whether the corresponding context depend on any other of the corresponding contexts or share a bounding word with any other of the corresponding contexts.

10. The medium of claim 8, wherein the one or more linguistic features include x-gram extracted from the input text with x being an integer, wherein a specified x-gram with a smaller x is used to capture shorter phrases and a specified x-gram with a larger x is used to capture longer phrases with more details.

11. The medium of claim 9, wherein the step of filtering the plurality of initial phrases comprises:

identifying a first list of entities for each of the plurality of initial phrases;

obtaining a second list of association entities with respect to the first list of entities for each of the plurality of initial phrases;

receiving information associated with the independent context on a topic and a tense associated the independent context;

removing any of the plurality of initial phrases based on some pre-defined criteria defined based on the first list of entity, the second list of association entities associated with each of the plurality of initial phrases, as well as the topic and the tense associated with the independent context; and generating the plurality of filtered candidate phrases based on remaining initial phrases.

12. The medium of claim 8, wherein the step of identifying the top k phrases comprises:

computing phrase features for each of the plurality of filtered candidate phrases;

ranking the plurality of filtered candidate phrases by sorting the plurality of filtered candidate phrases according to a sorting criterion to produce a ranked list of filtered candidate phrases; and selecting the first k filtered candidate phrases from the ranked list of filtered candidate phrases as the top k phrases for the independent context.

13. The medium of claim 12, wherein the phrase features include a length, a sentiment score, and a part-of-speech (POS) weight assigned to the filtered candidate phrase; and the sorting criterion specifies how to sequence the plurality of filtered candidate phrases according to an ascending or a descending order of each of the phrase features computed for the plurality of filtered candidate phrases.

14. The medium of claim 8, wherein the step of selecting a most insightful phrase from the top k phrases for each independent context comprises:

receiving the top k phrases selected for the independent context;

selecting a first most insightful phrase from the top k phrases based on a first phrase selection model;

selecting a second most insightful phrase from the top k phrases based on a second phrase selection model;

integrating the first and the second most insightful phrases via a deep learned phrase selection model to generate the best insightful phrase, wherein the first phrase selection model operates based on phrase vector representations for top k phrases, the second phrase selection model operates based on phrase features of the top k phrases.

15. A system, comprising:

an input text preprocessor implemented by a processor and configured for receiving an input text based on which at least one insightful phrase is to be extracted;

an independent context identification mechanism implemented by a processor and configured for identifying, from the input text, first and second independent contexts without a common bounding word;

a phrase extraction engine implemented by a processor and configured for generating top k phrases, wherein for each of the independent contexts, the top k phrases are generated by:

obtaining a plurality of initial phrases based on one or more linguistic features, filtering the plurality of initial phrases to generate a plurality of filtered candidate phrases, computing phrase features for each of the plurality of filtered candidate phrases, and identifying the top k phrases from the plurality of filtered candidate phrases based on their respective phrase features;

a model-based phrase selector implemented by a processor and configured for selecting, for each of the independent contexts, a most insightful phrase from the top k phrases for the independent context based on an artificial neural network that integrates diverse phrase selection models established based on different types of phrase features, and a processor for understanding the input text based on the selected one or more most insightful phrases.

16. The system of claim 15, wherein the independent context identification mechanism comprises:

a multiple context detector implemented by a processor and configured for determining one or more topics included in the input text, and identifying, with respect to each of the one or more topics, an individual context associated with the topic to generate corresponding contexts associated with the one or more topics;

a multiple context dependency detector implemented by a processor and configured for determining whether each of the corresponding contexts is dependent on any other of the corresponding contexts; and a context bounding determiner implemented by a processor and configured for determining whether each of the corresponding contexts shares a bounding word with any other of the corresponding contexts, wherein
a corresponding context is independent when it does not depend on any other of the corresponding contexts and does not share a bounding word with any other of the corresponding contexts.

17. The system of claim 15, wherein the phrase extraction engine comprises a candidate phrase filter implemented by a processor and configured for filtering the plurality of initial phrases by:
  identifying a first list of entities for each of the plurality of initial phrases;
  obtaining a second list of association entities with respect to the first list of entities for each of the plurality of initial phrases;
  receiving information associated with the independent context on a topic and a tense associated the independent context;
  removing any of the plurality of initial phrases based on some pre-defined criteria defined based on the first list of entity, the second list of association entities associated with each of the plurality of initial phrases, as well as the topic and the tense associated with the independent context; and
  generating the plurality of filtered candidate phrases based on remaining initial phrases.

18. The system of claim 15, wherein the phrase extraction engine further comprises a top-k phrase selector implemented by a processor and configured for identifying the top k phrases by:
  computing phrase features for each of the plurality of filtered candidate phrases;
  ranking the plurality of filtered candidate phrases by sorting the plurality of filtered candidate phrases according to a sorting criterion to produce a ranked list of filtered candidate phrases; and
  selecting the first k filtered candidate phrases from the ranked list of filtered candidate phrases as the top k phrases for the independent context.

19. The system of claim 18, wherein
  the phrase features include a length, a sentiment score, and a part-of-speech (POS) weight assigned to the filtered candidate phrase; and
  the sorting criterion specifies how to sequence the plurality of filtered candidate phrases according to an ascending or a descending order of each of the phrase features computed for the plurality of filtered candidate phrases.

20. The system of claim 15, wherein the artificial neural network includes:
  a first phrase selection model implemented by a processor and configured for selecting a first most insightful phrase from the top k phrases associated with an independent context based on phrase vector representations of the top k phrases;
  a second phrase selection model implemented by a processor and configured for selecting a second most insightful phrase from the top k phrases based on phrase features of the top k phrases; and
  an integration layer implemented by a processor and configured for integrating the first and the second most insightful phrases to generate the best insightful phrase.

* * * * *